United States Patent [19]

Nelson

[11] Patent Number: 4,873,279

[45] Date of Patent: Oct. 10, 1989

[54] COPOLYESTER-CARBONATE AND POLYESTER RESIN BLENDS EXHIBITING IMPROVED COLOR PROPERTIES

[75] Inventor: Linda H. Nelson, Evansville, Ind.

[73] Assignee: General Electric Company, Mt. Vernon, Ind.

[21] Appl. No.: 944,036

[22] Filed: Dec. 22, 1986

[51] Int. Cl.$^4$ .......................... C08K 5/05; C08K 5/15
[52] U.S. Cl. ................... 524/384; 524/101; 524/114; 524/207; 524/247; 524/248; 524/249; 524/380; 524/385; 524/386; 524/387; 524/537; 524/166
[58] Field of Search ............... 524/109, 114, 101, 207, 524/247, 248, 249, 250, 380, 384, 385, 386, 387, 537, 166

[56] References Cited

U.S. PATENT DOCUMENTS

| | | | |
|---|---|---|---|
| 2,901,466 | 8/1959 | Kibler et al. | 528/288 |
| 3,448,067 | 6/1969 | Penneck | 524/387 |
| 3,833,537 | 9/1974 | Jacquiss | 524/114 |
| 3,978,020 | 8/1976 | Liberti | 524/133 |
| 4,076,686 | 2/1978 | Calkins | 524/109 |
| 4,302,382 | 11/1981 | Spanswick | 524/109 |
| 4,469,850 | 9/1984 | Belfoure et al. | 524/537 |
| 4,581,382 | 4/1986 | Liberti et al. | 524/109 |

FOREIGN PATENT DOCUMENTS

| | | | |
|---|---|---|---|
| 10841 | 5/1968 | Japan | 524/109 |
| 6152862 | 11/1981 | Japan | 524/537 |

*Primary Examiner*—John Kight
*Assistant Examiner*—Kriellion Sanders
*Attorney, Agent, or Firm*—Martin B. Barancik

[57] ABSTRACT

A resinous composition comprising:
(i) at least one copolyester-carbonate resin;
(ii) at least one polyester resin; and
(iii) a minor amount of a mixture of at least one polyol and at least one epoxide.

24 Claims, No Drawings

COPOLYESTER-CARBONATE AND POLYESTER RESIN BLENDS EXHIBITING IMPROVED COLOR PROPERTIES

BACKGROUND OF THE INVENTION

Blends of copolyester-carbonates and polyesters are known in the art. These blends exhibit many excellent properties which render them useful for making films, fibers, and molded articles. They exhibit, for example, better ductility than neat polyesters and better processability than neat copolyester-carbonates. However, many of these blends have a tendency to discolor or yellow. It would be very advantageous if blends of copolyester-carbonate and polyester resins which tend to yellow could be provided which possessed improved color properties, i,e., reduced yellowing.

It has now been discovered that yellowing in copolyester-carbonate/polyester resin blends which tend to yellow can be reduced by adding to these blends a mixture of at least one polyol and at least one epoxide in minor amounts.

SUMMARY OF THE INVENTION

The instant invention is directed to compositions comprising a major portion of at least one aromatic copolyester-carbonate resin and at least one polyester resin and a minor portion of a mixture comprised of at least one polyol and at least one epoxide. When the polyol and epoxide are added to copolyester-carbonate/polyester blends which have a tendency to yellow they function as antiyellowing agents, i.e., reduce the amount of yellowing of these blends.

DESCRIPTION OF THE INVENTION

It has been discovered that color formation such as yellowing in blends comprised of an aromatic copolyestercarbonate resin and polyester resin can be reduced or inhibited by incorporating in said blends or admixing therewith a color stabilizer comprised of a mixture of at least one polyol and at least one epoxide. This color stabilizer mixture or color stabilizer acts to inhibit or reduce yellowing in the copolyestercarbonate/polyester blends.

The color stabilizer is added to or mixed with the blends of copolyestercarbonate/polyester in relatively small amounts. The color stabilized blends exhibit better color properties, i.e., reduced yellowing, than comparable non-stabilized blends.

This reduction of yellowing by the instant polyol/epoxide mixtures is exhibited by blends containing a wide ratio of copolyestercarbonate to polyester resin.

The copolyestercarbonate resins utilized in the instant invention are well known thermoplastic resins which are described, along with methods for their preparation, inter alia, in U.S. Pat. Nos. 3,169,121; 4,238,597; 4,156,069; 4,238,597 and 3,559,388, all of which are incorporated herein by reference.

Briefly stated the high molecular weight thermoplastic aromatic copolyester-carbonate resins comprise recurring carbonate groups, carboxylate groups, and aromatic carbocyclic groups in the polymer chain in which at least some of the carbonate groups and at least some of the carboxylate groups are bonded directly to the ring carbon atoms of the aromatic carbocylic groups. The copolyester-carbonates contain ester bonds and carbonate bonds in the polymer chain, wherein the amount of ester bonds is in the range of from about 25 to about 90 mole percent, preferably from about 35 to about 80 mole percent. For example, 5 moles of bisphenol-A reacting completely with 4 moles of isophthaloyl dichloride and 1 mole of phosgene would yield a copolyester-carbonate of 80 mole percent ester bonds.

The copolyester-carbonates may be prepared by a variety of methods including melt polymerization, transesterification, and the interfacial polymerization process.

These copolyester-carbonates may conveniently be prepared by the interfacial polymerization process by the reaction of (i) at least one dihydric phenol, (ii) a carbonate precursor, and (iii) at least one ester percursor.

The dihydric phenols utilized may typically be represented by the formula

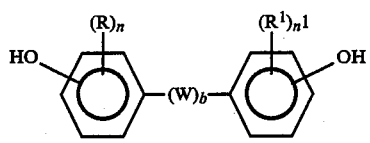

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals,

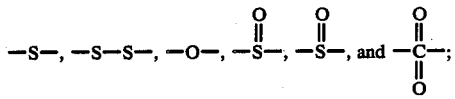

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl, and alkaryl radicals. The preferred alkyl radicals are the $C_1$-$C_{12}$ alkyls. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms. The preferred halogen radicals represented by R and $R^1$ are chlorine and bromine.

The monovalent hydrocarbonoxy radicals represented by R and $R^1$ may be represented by the formula

—OR'  II wherein R' is a monovalent hydrocarbon radical of the type described for R and $R^1$ hereinafore. The preferred monovalent hydrocarbonoxy radicals are the alkoxy radicals and the aryloxy radicals.

The divalent hydrocarbon radicals represented by W in Formula I include the alkylene radicals, the alkylidene radicals, the cycloalkylene radicals, and the cycloalkylidene radicals. The preferred alkylene radicals are those containing from 2 to about 30 carbon atoms. These alkylene radicals may be straight chain alkylene radicals or branched alkylene radicals. The preferred alkylidene radicals are those containing from 1 to about 30 carbon atoms. These alkylidene radicals may be straight chain alkylidene radicals or branched alkylidene radicals.

The preferred cycloalkylene radicals are those containing from 6 to about 16 ring carbon atoms. The preferred cycloalkylidene radicals are those containing from 6 to about 16 ring carbon atoms. The cycloalkylene radicals may contain substituent groups, such as alkyl groups, on the ring. Preferred alkyl groups are those containing from 1 to about 5 carbon atoms. The cycloalkylidene radicals may likewise contain substituent groups, such as alkyl groups, on the ring. These alkyl groups likewise preferably contain from 1 to about 4 carbon atoms.

Some illustrative non-limiting examples of dihydric phenols of Formula I include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4'-thiodiphenol; and
bis(4-hydroxyphenyl)ether.

Other dihydric phenols which are useful are described in U.S. Pat. Nos. 2,998,835; 3,028,365 and 3,334,154, all of which are incorporated herein by reference.

The carbonate precursor may be a carbonyl halide; a carbonate ester; or a bishaloformate. The carbonyl halides may be carbonyl bromide, carbonyl chloride, or mixtures thereof. The carbonate esters may be diphenyl carbonate; di(halophenyl)carbonates such as di(bromophenyl) carbonate, di(chlorophenyl)carbonate, and di(tribromophenyl)carbonate; di(alkylphenyl) carbonates such as di(tolyl)carbonate; di (naphthyl)carbonate; chlorophenyl chloronaphthyl carbonate; and phenyl tolyl carbonate. The bishaloformates that can be used include the bishaloformates of dihydric phenols such as the bichloroformates of bisphenol-A and hydroquinone; and the bishaloformates of glycols such as the bischloroformates of ethylene glcyol, neopentyl glycol, and polyethylene glycol. The preferred carbonate precursor is carbonyl chloride, also known as phosgene.

The ester precursor may be a difunctional carboxylic acid or, preferably the ester forming reactive derivative of the difunctional carboxylic acid. In general, any of the difunctional carboxylic acids, such as the dicarboxylic acids, and preferably any ester forming reactive derivative thereof, conventionally used in the preparation of linear polyesters may be utilized in the preparation of the instant copolyester-carbonates. In general the difunctional carboxylic acids, preferably their ester forming reactive derivatives, include the aliphatic dicarboxylic acids, the aromatic dicarboxylic acids, and the aliphatic-aromatic dicarboxylic acids, and their ester forming reactive derivatives. Some useful difunctional carboxylic acids are disclosed in U.S. Pat. No. 3,169,121, which is hereby incorporated herein by reference.

Particularly useful difunctional carboxylic acids, preferably their ester forming reactive derivatives, are the aromatic dicarboxylic acids.

The preferred ester forming reactive derivatives of the aromatic dicarboxylic acids are the diacid halides, preferably the diacid chlorides. Some illustrative non-limiting examples of these derivatives are isophthaloyl dichloride, terephthaloyl dichloride, and mixtures thereof. A particularly useful mixture of the ester forming reactive derivatives of isophthalic acid and terephthalic acid is one which contains a weight ratio of isophthaloyl dichloride to terephthaloyl dichloride of from about 1:10 to about 9.8:0.2

Particularly useful copolyester-carbonates are those containing from about 70 to about 80 mole percent ester content, said ester content being comprised of from about 1 to about 10 mole % terephthalate and from about 90 to about 99 mole percent isophthalate.

A convenient process for the preparation of the copolyester-carbonate resins is the interfacial polymerization process. This process utilizes two different solvent media which are immiscible. One solvent medium is an aqueous basic medium while the other medium is an organic medium such as methylene chloride. Also employed in this process are molecular weight regulators which control the chain length or molecular weight of the polymer by a chain terminating mechanism, and catalysts. The molecular weight regulators are well known in the art and include, but are not limited to, phenol itself, p-tertiarybutyl phenol, and chroman-I. The catalysts are also well known in the art and include, but are not limited to, tertiary amines such as triethylamine, quaternary ammonium compounds such as tetraethyl ammonium bromide, and quaternary phosphonium compounds such as n-butyl triphenyl phosphonium.

Also included within the term copolyestercarbonates are the randomly branched thermoplastic copolyestercarbonates, wherein a branching agent, which is generally a polyfunctional aromatic compound, is reacted with the dihydric phenol, the carbonate precursor, and the ester precursor. These polyfunctional aromatic compounds contain at least three functional groups which may be carboxyl, carboxylic anhydride, haloformyl, and mixtures thereof. Some illustrative non-limiting examples of these aromatic polyfunctional compounds include trimellitic anhydride, trimellitic acid, trimellityl trichloride, 4-chloroformyl phthalic anhydride, pyromellitic acid, pyromellitic dianhydride, mellitic acid, trimesic acid, and benzophenonetetracarboxylic acid.

The polyester resins are well known in the art and are amply described, along with methods for their preparation, in the literature. They are described, inter alia, in U.S. Pat. Nos. 2,485,319; 3,047,539; 3,317,464; 3,351,624; 3,498,950 and 4,066,627; and in Billmeyer, F. W., Jr., Textbook of Polymer Science, Interscience Publishers, New York, N.Y., 1962, pp. 434–436, 472–475 and 504–505. all of which are incorporated herein by reference.

The polyesters may generally be prepared by the reaction of a dicarboxylic acid with a glycol.

The polyesters may be either aliphatic, aromatic, or aliphatic-aromatic in character. The polyesters are characterized in that they have recurring ester units in the polymer chain, i.e., carboxylate groups bonded to a carbon atom of a hydrocarbon or substituted hydrocarbon radical.

The preferred polyesters for use in the instant invention generally contain at least one recurring structural unit represented by the general formula

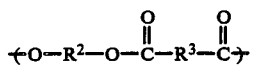

III.

wherein $R^2$ and $R^3$ are independently selected from divalent hydrocarbon radicals or substituted divalent hydrocarbon radicals.

In the case of aliphatic polyesters both $R^2$ and $R^3$ are independently selected from divalent divalent aliphatic hydrocarbon radicals. The divalent aliphatic hydrocarbon radicals include the alkylene, alkenylene, alkylidene, cycloalkylene, cycloalkylidene, and cycloalkenylene radicals. Preferred alkylene radicals are those containing from 2 to about 20 carbon atoms. The preferred alkylidene radicals are those containing from 1 to about 20 carbon atoms. The preferred alkenylene radicals are those containing from 2 to about 20 carbon atoms. The preferred cycloalkylene, cycloalkylidene, and cycloalkenylene radicals are those containing from about 4 to about 8 ring carbon atoms. The substituted divalent aliphatic hydrocarbon radicals are those divalent aliphatic hydrocarbon radicals described above which contain at least one substituent group, preferably from one to about three substituent groups. The preferred substituent groups are the halogens, nitro groups, and amino groups.

The aromatic polyesters suitable for use in the instant invention generally contain at least one recurring structural unit of Formula III wherein $R^2$ and $R^3$ are independently selected from divalent aromatic radicals or substituted divalent aromatic radicals. The divalent aromatic radicals represented by $R^2$ and $R^3$ include the phenylene radical, the substituted phenylene radical, the biphenylene radical, the substituted biphenylene radical, the naphthylene radical, the substituted naphthylene radical, and radicals represented by the general formula

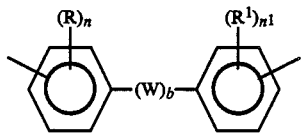

IIIa.

wherein R, $R^1$, W, n, $n^1$ and b are as defined hereinafore.

Particularly useful aromatic polyesters are those wherein $R^3$ is a phenylene radical and $R^2$ is a radical represented by Formula IIIa.

The aliphatic aromatic polyesters are those wherein one of $R^2$ or $R^3$ is a divalent aromatic radical and one of $R^2$ or $R^3$ is a divalent aliphatic radical. Preferred aliphatic aromatic polyesters are those wherein $R^2$ is a divalent aliphatic radical or substituted divalent aliphatic radical and $R^3$ is a divalent aromatic radical or substituted divalent aromatic radical.

One class of particularly useful aliphatic aromatic polyesters are the polyalkylene terephthalates and polyalkylene isophthalates. These types of polyesters contain at least one recurring structural unit represented by the general formula

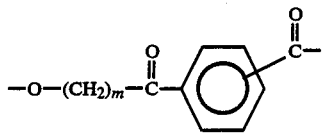

IIIb.

wherein m is a whole number having a value of from 2 to about 8 inclusive. Especially preferred polyesters of Formula IIIb are polyethylene terephthalate and poly(1,4-butylene terephthalate).

Another class of particularly useful aliphatic aromatic polyesters are polyester copolymers or copolyesters which can, without limitation, comprise the reaction products of: (a) a glycol portion comprising a 1,4-cyclohexane dimethanol with an acid portion comprising terephthalic acid, isophthalic acid, or mixtures thereof; or (b) a glycol portion comprising a 1,4-cyclohexane dimethanol and ethylene glycol wherein the molar ratio of the 1,4-cyclohexane dimethanol to the ethylene glycol in the glycol portion is from about 4:1 to about 1:4, with an acid portion comprising terephthalic acid, isophthalic acid, or mixtures thereof.

These types of copolyesters may be prepared by procedures well known in the art, such as by condensation reactions substantially as shown and described in U.S. Pat. No. 2,901,466, which is hereby incorporated herein by reference. More particularly, the acid or mixtures of acids or alkyl esters of the aromatic dicarboxylic acid or acids, for example, dimethylterephthalate, together with the dihydric alcohols are charged to a flask and heated to a temperature sufficient to cause condensation of the copolymer to begin, for example 175°-22520 C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid compound is employed, an ester interchange type of catalyst is preferred, such as $NaH\ Ti(OC_4H_9)_6$ in n-butanol. If a free acid is being reacted with free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can be advantageously increased with or without the immediate application of vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well known techniques. Thus, the highly monomeric condensation product can be cooled, pulverized, and the powder heated to a temperature somewhat less than employed during the last stage of molten polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under greatly reduced pressure.

These copolyesters will generally have an intrinsic viscosity of at least about 0.4 dl/gm as measured in 60/40 phenol/tetrachloroethane or other similar solvents at about 25° C. and will have a heat distortion temperature from about 60° C. to about 70° C. The relative amounts of the 1,4-cyclohexane dimethanol to ethylene glycol in the glycol portion of the copolyester (b) may vary so long as the molar ratio of 1,4- cyclohexane dimethanol to ethylene glycol is from about 1:4 to about 4:1, in order to provide a polyester copolymer having suitable heat distortion temperatures within the recited range, and other suitable properties.

One quite useful type of copolyester is a copolyester of the type described hereinafore wherein the glycol portion has a predominance of ethylene glycol over 1,4-cyclohexane dimethanol, for example greater than 50/50 and especially preferably is about 70 molar ethylene glycol to 30 molar 1,4-cyclohexane dimethanol, and the acid portion is terephthalic acid. A preferred copolyester of this type is commercially available from Eastman Chemical Co. under the tradename KODAR PETG 6763. A preferred copolyester is one derived from 1,4-cyclohexane dimethanol as the glycol portion and a mixture of isophthalic and terephthalic acids as the acid portion. This type of copolyester is available from Eastman Chemical Co. under the tradename KODAR A150.

The ratios of the polyesters to the copolyestercarbonates in the instant blends may vary widely. Generally, compositions which contain from about 5 to about 95 weight % of copolyester-carbonate and from about 95 to about 5 weight percent polyester are preferred, while compositions containing from about 20 to about 80 weight % copolyester-carbonate and from about 80 to about 20 weight % polyester are more preferred. Weight percent copolyester-carbonate is based on the total amounts of copolyester-carbonate and polyester resins present.

The polyols which are admixed with the epoxides and then added to the copolyester-carbonate/polyester resin blends, and which function as color stabilizers in those blends exhibiting yellowing, are well known compounds which are amply described in the literature and are generally commercially available or may be prepared by known methods.

They may be represented by the general formula

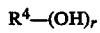    IV wherein:
$R^4$ is an aliphatic hydrocarbon moiety, a substituted aliphatic hydrocarbon moiety, an aliphaticaromatic hydrocarbon moiety, or a substituted aliphaticaromatic hydrocarbon moiety, preferably containing from 2 to about 20 carbon atoms, with the proviso that when $R^4$ is an aliphatic-aromatic or substituted aliphatic-aromatic hydrocarbon moiety the hydroxyl groups are bonded to only the aliphatic portion of said moiety; and r is a positive integer having a value of from 2 up to the number of replaceable hydrogen atoms present on $R^4$, and preferably has a value of from 2 to about 8.

The aliphatic hydrocarbon moieties represented by $R^4$ include the acylic aliphatic moieties and the cycloaliphatic moieties. The acylic aliphatic moieties are preferably those containing from 2 to about 20 carbon atoms in either a straight chain or branched chain. They are preferably saturated. The cyclic aliphatic moieties are preferably those containing from 4 to about 8 ring carbon atoms. These cyclic aliphatic moieties may contain alkyl substituent groups on the ring carbon atoms, and the hydroxyl groups may be bonded to either the ring carbon atoms or to the alkyl substituent groups, or to both.

The aliphatic-aromatic hydrocarbon moieties represented by $R^4$ are those containing an aromatic portion which preferably contains from 6 to 12 ring carbon atoms, i.e., phenyl, naphthyl, and biphenyl, and an aliphatic portion bonded to the ring carbon atoms of the aromatic portion, with the hydroxyl groups being present only on the aliphatic portion. It is to be understood that only one aliphatic portion may be bonded to the aromatic portion, or two or more aliphatic portions, e.g., alkyls, may be bonded to the aromaticportion. If more than one aliphatic portion is bonded to the aromatic portion of the aliphatic-aromatic moiety the hydroxyl groups may be present on different aliphatic portions.

The substituted aliphatic and substituted aliphatic-aromatic moieties represented by $R^4$ are those which contain substituent groups on the hydrocarbon moieties, preferably from 1 to about 4 substituent groups. The preferred substituent groups are the halogens, preferably chlorine and bromine, amino, and nitro groups. When more than one substituent group is present they may be the same or different.

Preferred polyols of Formula IV are the acylic aliphatic polyhydric alkanols, with the hexahydric alkanols being preferred. Preferred polyols of this type are those wherein the hydroxyl groups are bonded to different carbon atoms of the acyclic aliphatic hydrocarbon moiety.

Some illustrative non-limiting examples of polyols represented by Formula IV include cyclohexane dimethanol, butanediol, mannitol, sorbitol, 1,3-propanediol, glycerol, 1,2-cyclopentanediol, inositol, 1,3,5-cyclohexanetriol, 1,2,3,4,5-pentahydroxypentane, and 1,1,2,2-tetrahydroxyethane.

The polyols are admixed with epoxide compounds and this mixture is then added to the copolyestercarbonate and polyester containing composition. The epoxides which form the second component of this mixture are well known compounds which are amply described in the literature and which are generally commercially available or may be readily prepared by known and conventional procedures. The epoxides are characterized by containing at least one oxirane,

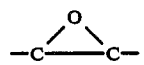

ring.

One useful group of epoxide compounds may be represented by the general formula

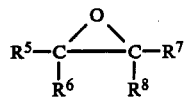

V.

wherein:

R⁵-R⁸ are independently selected from hydrogen, monovalent hydrocarbon radicals, substituted monovalent hydrocarbon radicals, —CH$_2$OR$^9$, —CH$_2$OCOR$^{10}$Z, —COOCH$_2$Z, —CH$_2$OR$^{10}$OCH$_2$Z, and —R$^{10}$Z radicals wherein R$^9$ is selected from monovalent hydrocarbon radicals, R$^{10}$ is a divalent hydrocarbon radical or a divalent hydrocarbon radical containing ether linkages, and Z is an oxirane ring.

The monovalent hydrocarbon radicals represented by R⁵-R⁸ are the same as those described for R hereinafore. The substituted monovalent hydrocarbon radicals are those as described for R except that they contain substituent group(s) thereon, preferably from 1 to about 4 substituent groups such as halogen, hydroxyl, amino, nitro, and the like.

The monovalent hydrocarbon radicals represented by R$^9$ are the same as those described for R hereinafore.

The divalent hydrocarbon radicals represented by R$^{10}$ include the alkylene, cycloalkylene, alkylidene, cycloalkylidene, arylene, alkarylene, and aralkylene radicals. The preferred alkylene radicals are those containing from 2 to about 24 carbon atoms. The preferred alkylidene radicals are those containing from 1 to about 24 carbon atoms. The preferred cycloalkylene and cycloalkylidene radicals are those containing from about 6 to about 16 ring carbon atoms. The preferred arylene radicals are those containing from 6 to 12 ring carbon atoms, i.e., phenylene, naphthalene, and biphenylene. The preferred aralkylene and alkarylene radicals are those containing from 7 to about 14 carbon atoms.

The divalent hydrocarbon radicals containing ether linkages represented by R$^{10}$ are those that contain from 2 to about 14 carbon atoms and from 1 to about 4 ether linkages. Preferred radicals of this type are the alkylene ether radicals which contain from 2 to about 14 carbon atoms and from 1 to about 4 ether linkages.

Preferred divalent hydrocarbon radicals represented by R$^{10}$ are the alkylene radicals, particularly those containing from 2 to about 24 carbon atoms.

The preferred epoxides of Formula V are those wherein at least R⁵ and R⁶ or R⁷ and R⁸ are independently selected from monovalent hydrocarbon radicals, substituted monovalent hydrocarbon radicals, —CH$_2$OR$^9$, —CH$_2$OCOR$^{10}$Z, —COOCH$_2$Z, —CH$_2$OR$^{10}$OCH$_2$Z, and —R$^{10}$Z, e.g., both R⁵ and R⁶ are monovalent hydrocarbon radicals while R⁷ and R⁸ can independently be hydrogen or monovalent hydrocarbon radicals, substituted monovalent hydrocarbon radicals, —CH$_2$OR$^9$, —CH$_2$OCOR$^{10}$Z, —COOCH$_2$Z, —CH$_2$OR$^{10}$OCH$_2$Z, or —R$^{10}$Z radicals.

Another class of preferred epoxides of Formula V are those wherein at least one of R⁵ and R⁶ and at least one of R⁷ and R⁸ are independently selected from aryl radicals and alkaryl radicals.

These types of epoxides are well known in the art and are generally commercially available or may be readily prepared by known and conventional methods. Some of these epoxides are described, inter alia, in U.S. Pat. No. 4,092,288, incorporated herein by reference.

Another useful group of epoxides may be represented by the general formula

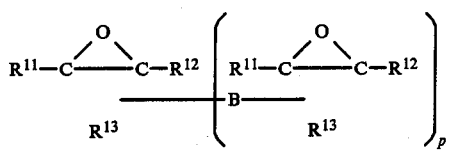

wherein:

R$^{11}$ and R$^{12}$ independently have the same meaning as R⁵-R⁸ described hereinafore;

R$^{13}$ is independently selected from a divalent hydrocarbon radical or a substituted divalent hydrocarbon radical which together with the two carbon atoms of the oxirane ring forms a ring system containing from 1 to 3 rings having from 4 to about 20 carbon atoms;

p is either zero or one; and

B is a divalent radical selected from divalent hydrocarbon radicals, divalent hydrocarbon radicals containing at least one ether linkage, and

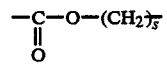

radicals wherein s has a value of from 1 to about 6.

The preferred divalent hydrocarbon radicals represented by R$^{13}$ are the divalent aliphatic hydrocarbon and substituted hydrocarbon radicals. These aliphatic radicals may be fully saturated or may contain one or two olefinic unsaturation sites, i.e., carbon-to-carbon double bonds. The preferred divalent aliphatic hydrocarbon radicals and substituted divalent aliphatic hydrocarbon radicals are the alkylene, alkenylene, cycloalkylene and cycloalkenylene radicals, with the alkylene and alkenylene radicals being preferred. The preferred alkylene radicals are those containing from 2 to about 18 carbon atoms. The preferred alkenylene radicals are those containing from 2 to about 18 carbon atoms and one or two double bonds. The substituted divalent aliphatic hydrocarbon radicals contain from 1 to about 4 substituent groups. The preferred substituent groups are the C$_1$–C$_{12}$ alkyls, C$_4$–C$_{10}$ cycloalkyls, aralkyls or alkaryls of from 7 to about 14 carbon atoms, aryls of from 6–12 ring carbon atoms, halogens, and hydroxyl. When more than one substituent group is present they may be the same or different.

The divalent hydrocarbon radicals and the divalent hydrocarbon radicals containing at least one ether linkage represented by B are the same as those described for R$^{10}$ hereinafore. The preferred divalent hydrocarbon radicals represented by B are the alkylene radicals, preferably those containing from 2 to about 24 carbon atoms.

These types of epoxides are well known in the art and are generally commercially available or may be readily prepared by known and conventional processes. Some of these types of epoxides are described, inter alia, in U.S. Pat. No. 4,154,329, incorporated herein by reference.

Some illustrative non-limiting examples of the epoxides of Formula Va include, when p is zero, the derivatives of epoxy cyclohexane and cyclododecane epoxide. When p is one the epoxides of Formula Va include compounds such as

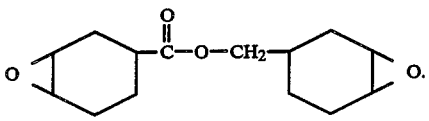

As mentioned above the epoxides of Formula Va include the derivatives of epoxy cyclohexane. These derivatives of epoxy cyclohexane may be represented by the general formula

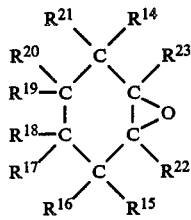

Vb.

wherein $R^{14}$-$R^{23}$ independently have the same meaning as $R^5$-$R^8$ hereinafore.

Preferred epoxides of Formula Vb are those wherein at least one of $R^{22}$ and $R^{23}$ is a radical other than hydrogen.

These derivatives of epoxy cyclohexane are well known in the art and are generally commercially available or may be readily prepared by known and conventional methods. They are described, inter alia, in U.S. Pat. No. 3,978,020, incorporated herein by reference.

Yet another group of epoxides that are useful may be represented by the general formula

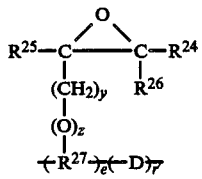

Vc.

wherein:

$R^{24}$-$R^{26}$ are independently selected from hydrogen, monovalent hydrocarbon radicals, and substituted monovalent hydrocarbon radicals;

$R^{27}$ is a divalent hydrocarbon radical, a substituted divalent hydrocarbon radical, or a divalent hydrocarbon radical containing at least one ether linkage;

e has a value of at least one;

r has a value of zero or at least one;

y has a value of from 0 to 4 inclusive;

z is either zero or one, with the proviso that y and z are not both zero; and

D is a divalent hydrocarbon radical, a substituted divalent hydrocarbon radical, or a divalent hydrocarbon radical containing at least one ether linkage.

The divalent hydrocarbon radicals and divalent hydrocarbon radicals containing at least one ether linkage represented by $R^{27}$ and D are the same as those described for $R^{10}$ hereinafore. The substituted divalent hydrocarbon radicals represented by $R^{27}$ and D are those divalent hydrocarbon radicals as described for $R^{10}$ except that they contain from 1 to about 4 substituent groups which may be selected from $C_1$-$C_{12}$ alkyl, halogen, nitro, amino, and hydroxyl.

The monovalent hydrocarbon radicals represented by $R^{24}$-$R^{26}$ are the same as those described for $R^5$-$R^8$ hereinafore. Likewise, the substituted monovalent hydrocarbon radicals represented by $R^{24}$-$R^{26}$ are the same as those described for $R^5$-$R^8$ hereinafore.

Illustrative of the epoxides of Formula Vc are those wherein z is one, y is one, $R^{24}$-$R^{26}$ are hydrogen, r' is zero, e is greater than one, and $R^{27}$ is an aromatic radical, preferably a $C_6$ aromatic radical. These types of compounds, e.g., epoxy novolac resins, are generally available commercially or may readily be prepared by known and conventional methods.

Still another group of epoxides that may be employed in the practice of the present invention are the triglycidylisocyanurates. These triglycidylisocyanurates may be represented by the general formula

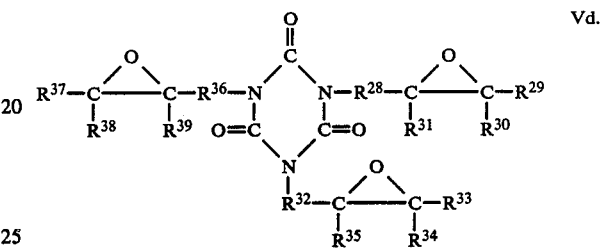

Vd.

wherein:

$R^{29}$-$R^{31}$, $R^{33}$-$R^{35}$, and $R^{37}$-$R^{39}$ independently have the same meaning as $R^5$-$R^8$ hereinafore; and $R^{28}$, $R^{32}$ and $R^{36}$ are independently selected from alkylene radicals containing from 1 to about 8 carbon atoms.

These triglycidylisocyanurates are well known in the art and are generally commercially available or may be readily prepared by known and conventional processes.

An illustrative non-limiting example of a compound of Formula Vd is one wherein $R^{29}$-$R^{31}$, $R^{33}$-$R^{35}$ and $R^{37}$-$R^{39}$ are all hydrogen; and $R^{28}$, $R^{32}$ and $R^{36}$ are all the methylene radical.

Still another group of epoxides that may be employed as stabilizers in the practice of the instant invention are the aromatic glycidyl ethers. These aromatic glycidyl ethers may be the monoglycidyl ethers, the diglycidyl ethers, or the aromatic polyglycidyl ethers containing 1 or more aromatic rings. These types of epoxides are disclosed in U.S. Pat. No. 3,839,247, which is incorporated herein by reference. Some illustrative non-limiting examples of these compounds include glycidol, bisphenol-A diglycidyl ether, tetrabromo bisphenol-A diglycidyl ether, diglycidyl ester of phthalic acid, and the like.

Some illustrative non-limiting examples of the epoxide compounds which may be utilized in the practice of the present invention include: cyclodododecane epoxide; ethylene glycol diglycidylether; triglycidylisocyanurate; 7-oxabicyclo[4.1.0]-3-methyl-3[7-oxabicyclo[4.1.0]heptane]carboxylate; 3,4-epoxy-cyclohexylmethyl-3,4-epoxy-cyclohexane carboxylate; 3,4-epoxy-cyclohexyl-ethylene-oxide; diglycidyl ester of hexahydrophatlic acid; bisepoxy dicyclopentadienyl ether; lomonene monoxide; tetraphenyl-ethylene epoxide; butadiene epoxide; octyl epoxy tallate; 3,4-dimethyl-1,2-epoxy cyclohexane; 3,5-dimethyl-1,2-epoxy cyclohexane; 4,5-epoxyoctane; 4,5-epoxy-4,5-dimethyloctane; 1,2-epoxy-1-propyl-cyclohexane; 1,2-epoxycyclohexane; 2,3-epoxy-3-methylbutane; lm3-epoxybutane; 1,1-diphenyl ethylene oxide; diethyl-di-n-butyl-3- tertbutyl-4,5-epoxy-cis-1,2-cyclohexane carboxylate; octadecyl-3,4-epoxy-cyclohexane carboxylate, etc.

Generally, the stabilizer contains a weight ratio of polyol to epoxide of from about 1:10 to about 10:1, preferably from about 1:5 to about 5:1, and more preferably from about 1:3 to about 3:1.

While the use of a polyol alone as a color stabilizer is effective in reducing or retarding color formation in the instant copolyester-carbonate/polyester blends, the addition of the epoxide to the polyol surprisingly has an unexpected effect upon the efficacy of the polyol in stabilizing or diminishing color formation, i.e., yellowing, in the blends. The use of the instant color stabilizer mixture of a polyol and an epoxide results in improved color stabiliziation or diminution of color formation such as yellowing in the blends.

The fact that a combination of a polyol and an epoxide reduces yellowing to a greater degree than a polyol alone is surprising and unexpected since the use of an epoxide alone generally has no substantial effect upon the reduction of yellowing in copolyester-carbonate/polyester resin blends.

The amount of the instant stabilizer added to the copolyester-carbonate/polyester blends is an amount which is effective to stabilize the color or reduce color formation in the blends, i.e., yellowing. Generally, this amount is at least about 0.01 weight percent, preferably at least about 0.05 weight percent, and more preferably at least about 0.10 weight percent. Weight percent of color stabilizer mixture is calculated based on the total amounts of said color stabilizer mixture and the blend of copolyestercarbonate/polyester resin present in the instant compositions. Generally, the amount of color stabilizer should not exceed about 5 weight percent, preferably about 2 weight percent, and more preferably about 1 weight percent.

In general, if less than about 0.01 weight percent of the color stabilizer is present there is no appreciable reduction in yellowing of the instant blends. If more than about 5 weight percent of the color stabilizer is used then some of the advantageous properties of the copolyester-carbonate/polyester blends may be adversely affected. The amount of stabilizer used is thus an amount which is effective to stabilize the color or reduce yellowing in the blends but insufficient to substantially deleteriously affect, to a substantial degree, substantially most of the advantageous properties of the blends.

The instant compositions may optionally contain various commonly known and used additives such as, for example; antioxidants; antistatic agents; mold release agents; impact modifiers; ultraviolet radiation absorbers such as the benzophenones, benzotriazoles, and cyanoacrylates; additional conventional color stabilizers such as the organophosphites; fillers such as talc, glass, mica, and clay; and flame retardants. Some useful flame retardants are the alkali and alkaline earth metal salts of organic sulfonic acids. These types of flame retardants are described, inter alia, in U.S. Pat. Nos. 3,933,734; 3,931,100; 3,978,024; 3,948,851; 3,926,908; 3,919,167; 3,909,490; 3,953,396; 3,953,396; 3,953,399; 3,917,559; 3,951,910 and 3,940,366, all of which are incorporated herein by reference.

DESCRIPTION OF THE PREFERRED EMBODIMENT

The following examples are set forth to further illustrate the present invention. These examples are not to be construed as limiting the invention thereto as they are set forth by way of illustration. Unless otherwise indicated, all parts and percentages given in the examples are parts and percentages by weight.

The following examples illustrate compositions falling outside the scope of the instant invention. They are presented for comparative purposes only.

EXAMPLE 1

A blend is prepared by admixing 50 parts by weight of a copolyester-carbonate resin (having an ester content of 75 mole %, said ester being 93 mole % isophthalate and 7 mole percent terephthalate; and being derived from bisphenol-A, phosgene, isophthaloyl dichloride, and terephthaloyl dichloride) and 50 parts by weight of a copolyester resin (KODAR A150 marketed by Eastman Chemical Co.). This blend is admixed with 0.03 parts by weight per hundred parts by weight of resin blend of a conventional organophosphite color stabilizer. This mixture is extruded on a Sterling single screw (1¾") extruder at a melt temperature of 570° F. Test plaques ⅛" in thickness are injection molded on a 3 oz, Van Dorn using a 570° F. melt set temperature, a 180° F. mold cavity temperature, and a 10/20 cycle time. The Yellowness Index (YI) of the test plaques is measured on a Gardner Colorimeter in accordance with test method ASTM D1925. The results are set forth in Table I.

EXAMPLE 2

This example illustrates a blend to which there has been added an epoxide.

The procedure of Example 1 is substantially repeated except that the mixture additionally contains 0.12 parts by weight per hundred parts by weight of resin blend of a diepoxide, i.e., 7-oxabicyclo[4.1.0]heptyl-3-methyl-3[7-oxabicyclo [4.1.0]heptane]carboxylate. The YI is determined and the results are set forth in Table I.

EXAMPLE 3

This example illustrates a blend to which there has been added a polyol, inositol.

The procedure of Example 1 is substantially repeated except that the mixture of the 50/50 blend of copolyester-carbonate/polyester and 0.03 phr organophoshite of Example 1 additionally contains 0.12 parts by weight per hundred parts by weight of resin blend of inositol. The YI is determined and the results are set forth in Table I.

EXAMPLE 4

This example illustrates a blend to which there has been added a different polyol, mannitol.

The procedure of Example 1 is substantially repeated except that the mixture of 50/50 blend of copolyester-carbonate/polyester and 0.03 phr organophosphite of Example 1 additionally contains 0.12 parts by weight per hundred parts by weight of resin blend of mannitol. The YI is determined and the results are set forth in Table I.

The following examples illustrate the compositions of the present invention.

EXAMPLE 5

This example illustrates a blend containing both a polyol (inositol) and an epoxide.

The procedure of Example 3 is substantially repeated except that the mixture of Example 3 additionally contains 0.12 parts by weight per hundred parts by weight of resin blend (phr) of the diepoxide 7-oxabicyclo[4.1.0-]heptyl-3-methyl-3[7-oxabicyclo[4.1.0.]heptane]carboxylate. The YI is determined and the results are set forth in Table I.

EXAMPLE 6

This example illustrates a blend containing both a polyol (mannitol) and an epoxide.

The procedure of Example 4 is substantially repeated except that the mixture of Example 4 additionally contains 0.12 parts by weight per hundred parts by weight of resin blend (phr) of the diepoxide 7-oxabicyclo[4.1.0-]heptyl-3-methyl-3[7-oxabicyclo[4.1.0]heptane]carboxylate. The YI is determined and the results are set forth in Table I.

TABLE I

| Example No. | Epoxide (phr) | Polyol (phr) mannitol | Polyol (phr) inositol | YI |
|---|---|---|---|---|
| 1 | — | — | — | 76.8 |
| 2 | 0.12 | — | — | 79.7 |
| 3 | — | — | 0.12 | 52.9 |
| 4 | — | 0.12 | — | 14.5 |
| 5 | 0.12 | — | 0.12 | 40.0 |
| 6 | 0.12 | 0.12 | — | 6.3 |

As illustrated by the data in Table I the addition of an epoxide to the copolyester-carbonate/polyester blend (Example 2) has no significant effect upon the YI of the blend. Examples 3 and 4 illustrate that the incorporation of polyols alone into the copolyester-carbonate/-copolyester blend significantly lowers the YI (decreases yellowness) of the blend, the degree of YI improvement being dependent upon the particular polyol utilized. The YI data for Examples 5 and 6, which illustrate the compositions of the instant invention, shows that the stabilizer mixture of the present invention is more effective in reducing the YI than the corresponding polyols used alone. Thus, comparing Example 5 with Example 3 shows that a mixture of inositol and a diepoxide lowers the YI by more than 10 points as compared to the inositol alone. Comparing Example 6 with Example 4 shows that a mixture of mannitol and a diepoxide lowers the YI by more than 50% as compared to the mannitol alone.

The instant compositions are useful in the production of shaped articles, e.g., extruded and molded articles, exhibiting reduced yellowing.

The combination of the polyol and the epoxide of the instant invention can also be advantageously added to or admixed with those copolyester-carbonate/polyester resin blends where discoloration or yellowing is not a significant problem, since this combination of polyol and epoxide, in addition to reducing yellowing in those blends which tend to yellow, also inhibits or reduces transesterification in copolyestercarbonate/polyester resin blends which are subject to transesterification. In such cases these compositions contain from about 0.01 to about 5 weight percent, preferably from about 0.05 to about 2 weight percent of the combination of at least one polyol and at least one epoxide. Weight percent of polyol and epoxide mixture is based on the total amounts of said mixture and the resin blend present.

Obviously, other modifications and variations of the present invention are possible in light of the above teachings. It is, therefore, to be understood that changes may be made in the particular embodiments of the invention described which are within the full intended scope of the invention as defined by the appended claims.

What is claimed is:

1. A resinous composition comprising:
   (i) at least one copolyester-carbonate resin;
   (ii) at least one polyester resin; and
   (iii) a minor amount of a mixture of at least one polyol and at least one epoxide, wherein said polyol is represented by the formula $$R^4\text{—(OH)}_r$$

wherein $R^4$ is selected from aliphatic hydrocarbon moieties, substituted aliphatic hydrocarbon moieties, aliphatic aromatic hydrocarbon moieties, or substituted aliphatic aromatic hydrocarbon moieties, with the proviso that if $R^4$ is an aliphatic aromatic or substituted aliphatic aromatic hydrocarbon moiety the hydroxyl radicals are present only on the aliphatic portion thereof; and r is a positive integer having a value of from 2 up to the number of replaceable hydrogen atoms present on $R^4$ wherein said amount of (iii) is an anti-yellowing effective amount.

2. The composition of claim 1 which contains at least about 0.01 weight percent of (iii), based on the total amounts of (i)–(iii) present.

3. The composition of claim 2 which contains at least about 0.05 weight percent of (iii).

4. The composition of claim 1 wherein $R^4$ contains from 2 to about 20 carbon atoms.

5. The composition of claim 4 wherein $R^4$ is an aliphatic hydrocarbon moiety or a substituted aliphatic hydrocarbon moiety.

6. The composition of claim 5 wherein r is an integer having a value of from 2 to about 8.

7. The composition of claim 6 wherein $R^4$ is selected from acyclic aliphatic hydrocarbon moieties or substituted acyclic aliphatic hydrocarbon moieties.

8. The composition of claim 7 wherein said polyol is selected from hexahydric alkanols.

9. The composition of claim 8 wherein said polyol is selected from mannitol, inositol, or mixtures thereof.

10. The composition of claim 1 wherein said epoxide is represented by the formula

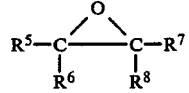

wherein:
$R^5$–$R^8$ are independently selected from hydrogen, monovalent hydrocarbon radicals, substituted monovalent hydrocarbon radicals, —CH$_2$OR$^9$, —CH$_2$OCOR$^{10}$Z, —COOCH$_2$Z, —CH$_2$R$^1$-OOCH$_2$Z, or —R$^{10}$Z radicals, wherein $R^9$ is selected from monovalent hydrocarbon radicals, $R^{10}$ is selected from divalent hydrocarbon radicals or divalent hydrocarbon radicals consisting at least one ether linkage, and Z is an oxirane ring.

11. The composition of claim 1 wherein said copolyester-carbonate resin contains from about 25 to about 90 mole percent ester bonds.

12. The composition of claim 11 wherein said copolyester-carbonate resin is comprised of the reaction products of (1) at least one dihydric phenol, (2) a carbonate precursor, and (3) at least one ester precursor.

13. The composition of claim 12 wherein said ester precursor is selected from aromatic dicarboxylic acids or their reactive ester forming derivatives.

14. The composition of claim 13 wherein said ester precursor is selected from isophthalic acid or its reactive ester forming derivative, terephthalic acid or its reactive ester forming derivative, or mixtures thereof.

15. The composition of claim 14 wherein said carbonate precursor is phosgene.

16. The composition of claim 15 wherein said dihydric phenol is bisphenol-A.

17. The composition of claim 12 wherein said polyester is a poly(alkylene terephthalate).

18. The composition of claim 17 wherein said poly(alkylene terephthalate) is selected from poly(ethylene terephthalate), poly(butylene terephthalate), or mixtures thereof.

19. The composition of claim 12 wherein said polyester is a poly(alkylene isophthalate).

20. The composition of claim 12 wherein said polyester is comprised of the reaction products of a glycol portion containing 1,4-cyclohexane dimethanol, ethylene glycol, or mixtures thereof, and an acid portion containing terephthalic acid, isophthalic acid, or mixtures thereof.

21. The composition of claim 1 which further contains a flame retardant amount of at least one flame retardant compound.

22. The composition of claim 21 wherein said flame retardant compound is selected from the alkali or alkaline earth metal salts of organic sulfonic acids.

23. The composition of claim 1 which contains from about 0.01 to about 5 weight percent of (iii), based on the total amounts of (i)–(iii) present.

24. The composition of claim 23 which contains from about 0.05 to about 2 weight percent of (iii), based on the total amounts of (i)–(iii) present.

* * * * *

UNITED STATES PATENT AND TRADEMARK OFFICE
CERTIFICATE OF CORRECTION

PATENT NO. : 4,873,279

DATED : October 10, 1989

INVENTOR(S) : Linda Harmon Nelson

It is certified that error appears in the above-identified patent and that said Letters Patent is hereby corrected as shown below:

Column 5

Line 11
Delete the second "divalent"

Column 6

Line 34
Delete "22520 C" and add "225°C

Signed and Sealed this

Sixteenth Day of October, 1990

Attest:

HARRY F. MANBECK, JR.

Attesting Officer

Commissioner of Patents and Trademarks